United States Patent [19]
Baioff et al.

[11] Patent Number: 6,015,095
[45] Date of Patent: Jan. 18, 2000

[54] POWDER PAINT COAT PRESSURE MONITORING DEVICE

[75] Inventors: Danny Baioff, Tecumseh; David A. Tiessen, Cottam; Gil Boucher, Tecumseh, all of Canada

[73] Assignee: Chrysler Corporation, Auburn Hills, Mich.

[21] Appl. No.: 09/143,247

[22] Filed: Aug. 28, 1998

[51] Int. Cl.⁷ .................................................. B67D 5/08
[52] U.S. Cl. ................... 239/71; 239/73; 239/74; 239/310; 239/346; 239/704; 73/706
[58] Field of Search .................. 239/71, 73, 74, 239/310, 318, 346, 692, 704; 73/706, 707

[56] References Cited

U.S. PATENT DOCUMENTS

| | | | |
|---|---|---|---|
| 2,881,617 | 4/1959 | Deis | 73/706 |
| 3,422,679 | 1/1969 | McGowan et al. | 73/706 |
| 4,185,783 | 1/1980 | Lacchia | 239/704 |
| 4,252,126 | 2/1981 | Mandi | 73/706 X |
| 5,232,155 | 8/1993 | Chen | 239/71 |
| 5,351,903 | 10/1994 | Mazakas et al. | 239/705 |
| 5,739,429 | 4/1998 | Schmitkons et al. | 73/196 |

FOREIGN PATENT DOCUMENTS 9002698  3/1990  WIPO.

*Primary Examiner*—Andres Kashnikow
*Assistant Examiner*—Robin O. Evans
*Attorney, Agent, or Firm*—Lawrence Shurupoff

[57] ABSTRACT

A pressure gauge assembly is disposed between a pump which pumps a powder from a fluidized bed and a spray applicator which sprays the powder onto a workpiece such as a vehicle body moving along a painting line. The pressure gauge assembly provides and early warning of clogging in the pump and/or applicator.

1 Claim, 2 Drawing Sheets

POWDER PAINT COAT PRESSURE MONITORING DEVICE

BACKGROUND OF THE INVENTION

1. Field of the Invention

The present invention relates in general to painting and coating apparatus of the type used to paint vehicles, and in particular to such apparatus having a pressure gauge assembly for detecting problems in both a feed pump and a spray applicator.

2. Description of Prior Developments

Automotive vehicles are typically covered with several different coating layers prior to being painted. One such coating is applied as a fine powder spray which is subsequently baked to form a strong substrate which resists chipping. The powder is applied under air pressure with a spinning applicator known as a "bell".

As a series of unpainted vehicle bodies passes through an enclosed room, electrically charged powder particles are discharged from a group of such bells in a mist or cloud. After a period of time, the powder tends to accumulate in the feed lines and on the exterior of the applicators or bells and eventually clogs the system. This can cause a significant problem when a high volume vehicle assembly or paint line has to be shut down while a feed line and/or an applicator bell is replaced or cleaned.

What is needed is an early warning that a feed line or applicator is becoming clogged before its performance becomes unacceptable.

SUMMARY OF THE INVENTION

The present invention has been developed to fulfill the needs noted above and, therefore, has as an object the provision of a powder spraying apparatus for coating vehicles which eliminates or minimizes the need to shut down a vehicle assembly line while an applicator pump, feed line or applicator nozzle or bell is cleaned or replaced.

Another object of the invention is the provision of a pressure gauge assembly which constantly monitors the pressure in a powder feed line between a pump and applicator to provide an early warning of a clogged component.

Still another object of the invention is to provide a pressure gauge with a limited sight window which delineates problem regions on opposite sides of the window.

These and other objects are met by the present invention which is directed to a pressure gauge assembly particularly adapted for use in a vehicle powder coating system. The gauge assembly includes an in-line fitting through which pressurized powder flows. A pressure gauge is connected to the fitting to provide a continuous pressure signal or read out of the pressure in the powder feed line to an applicator such as a bell. The face of the pressure gauge may be masked to cover all but a small acceptable operating region.

These and other objects, features and advantages of the invention will become more apparent as the following description proceeds, especially when considered with the accompanying drawings.

BRIEF DESCRIPTION OF THE DRAWINGS

In the drawings.

In the drawings, like reference numerals denote like or similar parts.

DETAILED DESCRIPTION OF THE PREFERRED EMBODIMENTS

Figure 1:
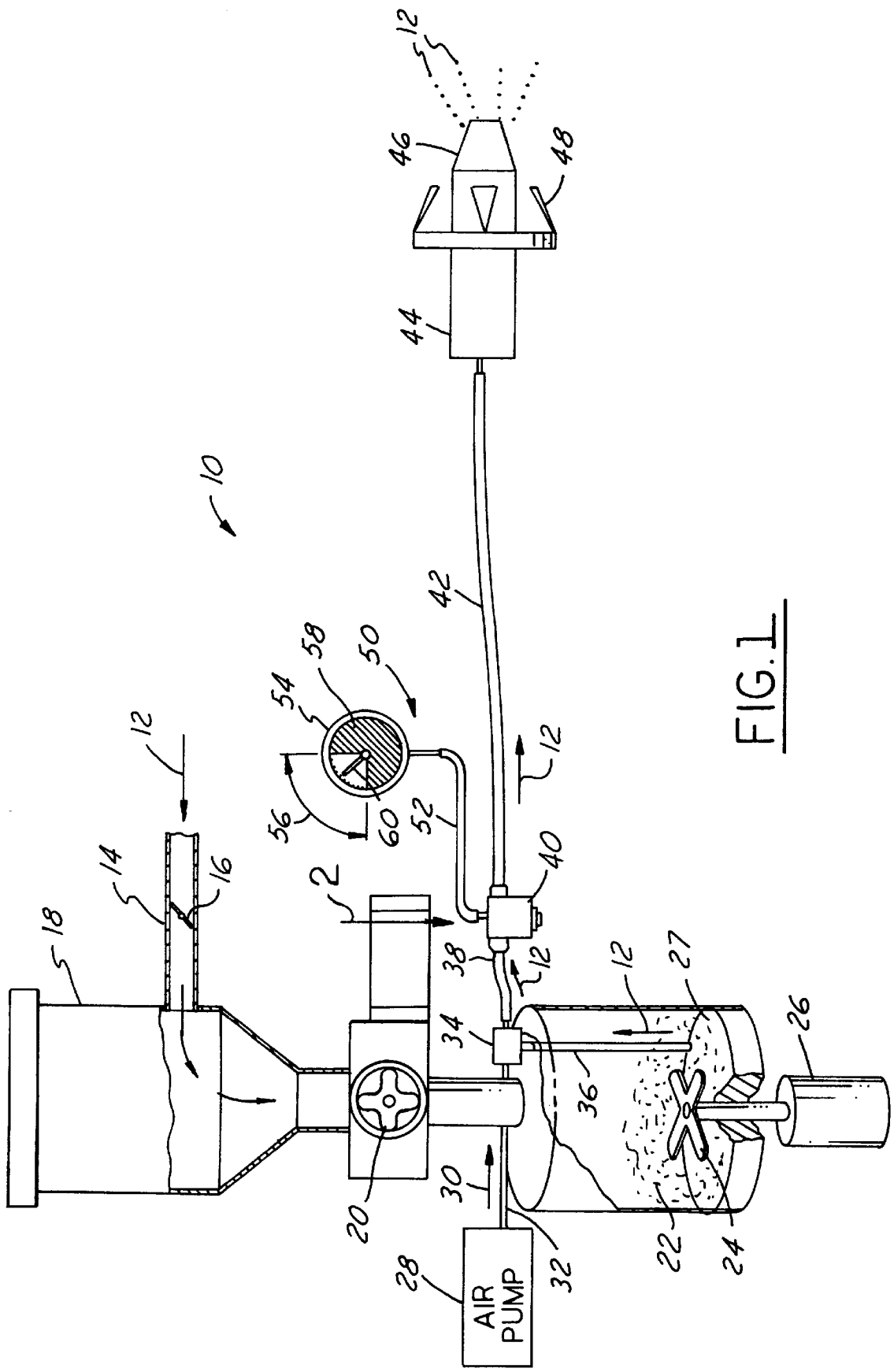
FIG. 1 is a schematic view of a powder spraying system constructed in accordance with the invention.

The present invention will now be described in conjunction with the drawings, beginning with FIG. 1 which shows a spraying spaying system 10 of the type used by vehicle manufacturers to coat automobile and truck bodies with various protective coatings. In this particular example, a powder material 12, such as used to form an anti-chip coating prior to painting, is introduced through conduit 14 and valve 16 into a hopper 18.

A rotary paddle wheel 20 meters the powder from hopper 18 into a fluidized bed chamber 22 while forming an air lock or seal between the hopper 18 and chamber 22. A rotating blade 24 driven by motor 26 produces a fluidized bed of powder 12 within chamber 22 so as to produce a fluidized powder source in a known manner. A porous filter 27 serves as the base of the fluidized bed.

An air pump 28 drives pressurized air 30 through conduit 32 and through venturi pump 34. This creates a suction or drawing force in draw pipe 36 which has an intake end 38 suspended in the cloud or mist of fluidized powder 12 in chamber 22. This suction draws the powder 12 through pipe 36 and into exhaust line 38.

The powder 12 is driven through pressure line fitting 40 and into a powder feed line 42. The pressurized fluidized powder 12 is then driven into a conventional applicator 44. The applicator 44 has a spinning head 46 which distributes the powder in an electrically-charged cloud. Air nozzles 48 may be provided to prevent the powder from blowing back on the applicator 44.

Up to this point, the paint system 10 as described is of a known conventional design except for the presence of fitting 40. That is, feed line 42 typically extends uninterrupted from venturi pump 34 up to applicator 44. In actual practice, a dozen or more applicators 44 are fed from a single chamber 22.

As the system of FIG. 1 is used, powder 12 tends to accumulate and clog the venturi pump 34, its vent pipe 36 and/or its exhaust line 38. Moreover, powder 12 also collects in and around the applicator 44 and over time clogs the applicator. In order to provide advance notice of such clogging, the pressure gauge assembly 50 has been added to the spraying system 10.

The pressure gauge assembly 50 includes the fitting or coupling 40, gauge line 52 which provides fluid communication between the fitting 40 and a pressure gauge 54 which completes the assembly. Pressure gauge 54 has a limited dial or read out portion 56 which defines a satisfactory range of pressure in feed line 42 for proper operation of the applicator 44 and a satisfactory range of pressure for the proper operation of venturi pump 34. The remainder of the dial is blocked off or masked as shown at 58.

In the example of FIG. 1, if indicating needle 60 of pressure gauge 54 slowly falls to the 9 o'clock position indicating a drop in air pressure, it is likely that a problem, such as a clogged air line is present upstream of fitting 40. This could be a clogged venturi pump 34, intake pipe 36 or exhaust line 38. The fitting 40 could also be clogged upstream of gauge line 52.

If the indicating needle slowly rises to the 12 o'clock position, indicating an increase in air pressure, it is likely that a problem, such as a clogged air line is present downstream of fitting 40. This could be a clogged applicator 44 or a clogged feed line 42. In either case of rising or falling pressure, gauge 54 provides an early indication of potential problems and allows an operator to correct the problem without shutting down the assembly line.

That is, as needle 60 approaches the masked area on gauge 54, an operator can remove and replace the suspected defective component in between the exit of one vehicle from and the entry of the next vehicle into the area of the powder spray applicators. Spare venturi pumps 34 with attached draw pipes 36, spare fittings 40, spare feed lines 42 and spare applicators 44 can be kept on hand for quick snap fit or push-pull type insertion into and out of the spraying system 10.

Figure 2:
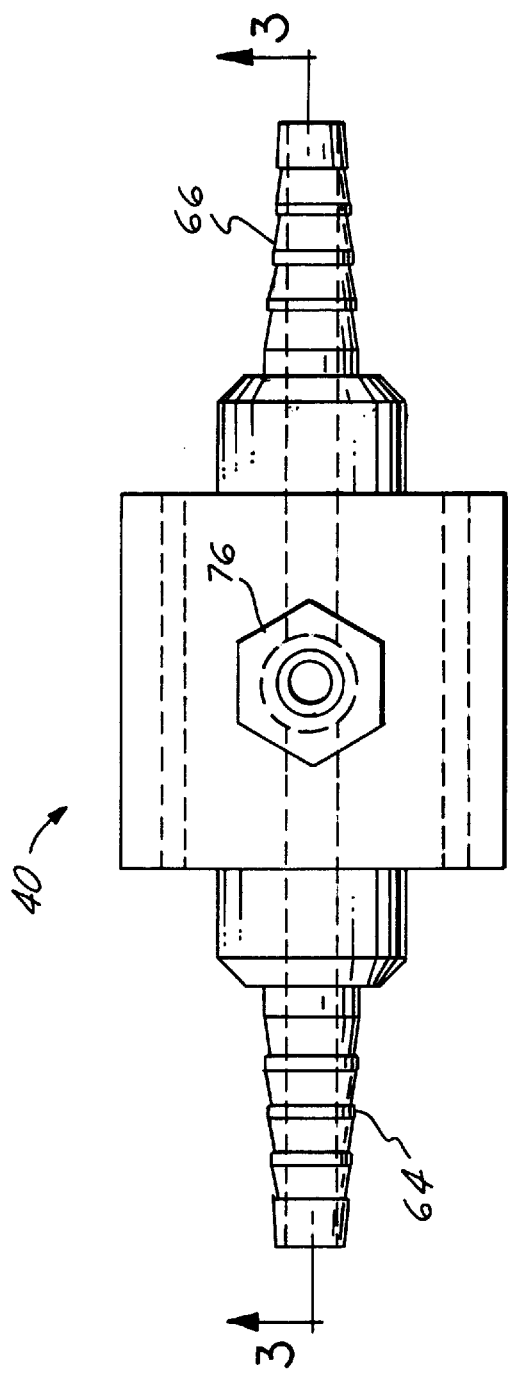
FIG. 2 is a top plan view of the fluid coupling of FIG. 1.
Figure 3:
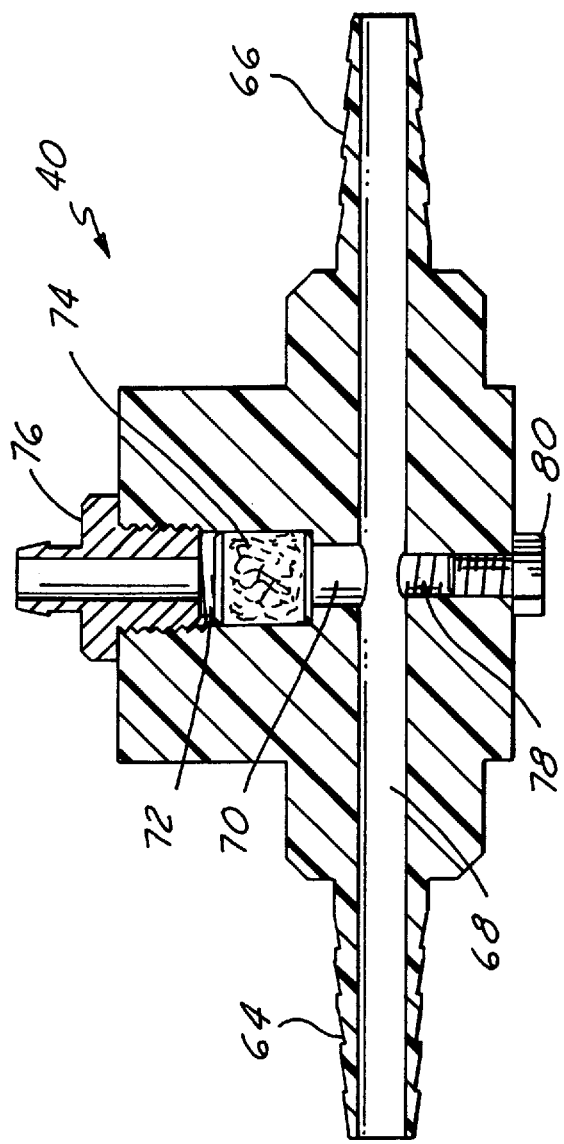
FIG. 3 is a view in section taken through line 3—3 of FIG. 2.

Details of the fitting 40 are shown in FIGS. 2 and 3 wherein fitting 40 is shown to have an inlet 64, an outlet 66 and a through bore forming a channel 68 interconnecting the inlet and outlet. A gauge line 70 communicates with channel 68. A cylindrical pocket 72 is formed in gauge line 70 for receiving a cylindrical filter 74 formed of a porous material such as the porous foamed plastic high density medium-coarse polypropylene material used to form filter 27 in chamber 22. Filter 74, which may be held in pocket 72 with an interference fit, prevents powder 12 from entering gauge line 52 and clogging gauge 54.

A barbed hose fitting 76 having a bore formed therethrough is threaded into a threaded portion of pocket 72 to provide a quick press fit and removal connection to gauge line 52 which forms a flexible extension of gauge line 70. Hose fitting 76 also locks the filter 74 within pocket 72. A knock out or removal bore 78 is formed in the body of fitting 40 and aligned coaxially with gauge line 70 and pocket 72.

A plug such as a threaded bolt 80 is normally inserted or threaded in removal bore 78. Bolt 80 can be temporarily removed to provide access to cylindrical pocket 72. A rod can then be inserted into knock out bore 78, and, with hose fitting 76 unscrewed and removed, filter 74 can be unseated with the rod removed and replaced as needed.

Many modifications and variations of the present invention are possible in light of the above teachings. Therefore, within the scope of the appended claims, the present invention may be practiced other than specifically described.

What is claimed is:

1. A powder spraying apparatus, comprising:

a source of powder;

a pump for pumping powder from said source of powder;

a powder feed line receiving said powder from said pump;

an applicator receiving said powder from said feed line;

a pressure gauge assembly communicating with said feed line between said pump and said applicator; said gauge assembly comprising a fitting having an inlet for receiving said powder, an outlet for exhausting said powder and a channel interconnecting said inlet and said outlet, a gauge line communicating with said channel, a pressure gauge communicating with said gauge line and a porous filter located in said gauge line between said channel and said pressure gauge; wherein said fitting further comprises a pocket and wherein said filter is held in said pocket; wherein said pocket comprises a bore and further comprising a hose fitting disposed in said bore and having a flow path formed therethrough thereby providing fluid communication between said channel and said gauge; wherein said bore comprises a threaded bore, said hose fitting comprises a threaded hose fitting threaded into said threaded bore and said filter is held in said bore by said threaded hose fitting; and a normally closed knock-out bore aligned with said pocket for providing access to said pocket for removal of said filter.

* * * * *